United States Patent
Conaway et al.

(10) Patent No.: US 7,753,421 B2
(45) Date of Patent: Jul. 13, 2010

(54) LONG-HANDLED TOOL WITH PLASTIC MOLDED-OVER HANDLE

(75) Inventors: Brian J. Conaway, Columbus, OH (US); Thomas W. Parker, Jamestown, PA (US); Charles B. Wilson, Dublin, OH (US)

(73) Assignee: Ames True Temper, Inc., Camp Hill, PA (US)

( * ) Notice: Subject to any disclaimer, the term of this patent is extended or adjusted under 35 U.S.C. 154(b) by 1158 days.

(21) Appl. No.: 11/067,262

(22) Filed: Feb. 25, 2005

(65) Prior Publication Data

US 2005/0189774 A1  Sep. 1, 2005

Related U.S. Application Data

(60) Provisional application No. 60/548,267, filed on Feb. 27, 2004.

(51) Int. Cl.
*A01B 1/22* (2006.01)
*B25G 1/10* (2006.01)

(52) U.S. Cl. .......................................... 294/57; 294/49

(58) Field of Classification Search ............... 294/7, 294/49, 57; 16/110.1, 431; 76/113; 81/489, 81/492
See application file for complete search history.

(56) References Cited

U.S. PATENT DOCUMENTS

| | | | | |
|---|---|---|---|---|
| 2,816,789 A * | 12/1957 | Finkes | ........................... | 294/57 |
| 3,619,009 A * | 11/1971 | O'Leary | ...................... | 299/105 |
| 4,790,586 A * | 12/1988 | Stoner, Jr. | ..................... | 294/57 |
| 5,365,637 A * | 11/1994 | Bodell et al. | ................... | 16/431 |
| 5,540,472 A * | 7/1996 | Dunlap | ......................... | 294/57 |
| 5,664,820 A * | 9/1997 | Carmien | ....................... | 294/57 |
| 6,662,406 B2 * | 12/2003 | Shonfeld et al. | .............. | 16/431 |

* cited by examiner

*Primary Examiner*—Dean J Kramer
(74) *Attorney, Agent, or Firm*—Eckert Seamans Cherin & Mellott, LLC; David C. Jenkins, Esq.

(57) ABSTRACT

A long-handled shovel includes a head having a blade and a socket and an elongate handle member partially extending into the socket of the head. The handle member is a tube. A rod partially extends into the handle member and partially extends into the socket to provide resilient flexing between the head and the handle member when prying forces are applied thereto. A collar encircles the socket to limit outward expansion of the socket. A continuous outer layer of plastic material is molded over the entire length of the handle member and at least partially molded over the socket and the collar. The outer layer provides added strength by extending over the joint between the handle member and the socket.

13 Claims, 3 Drawing Sheets

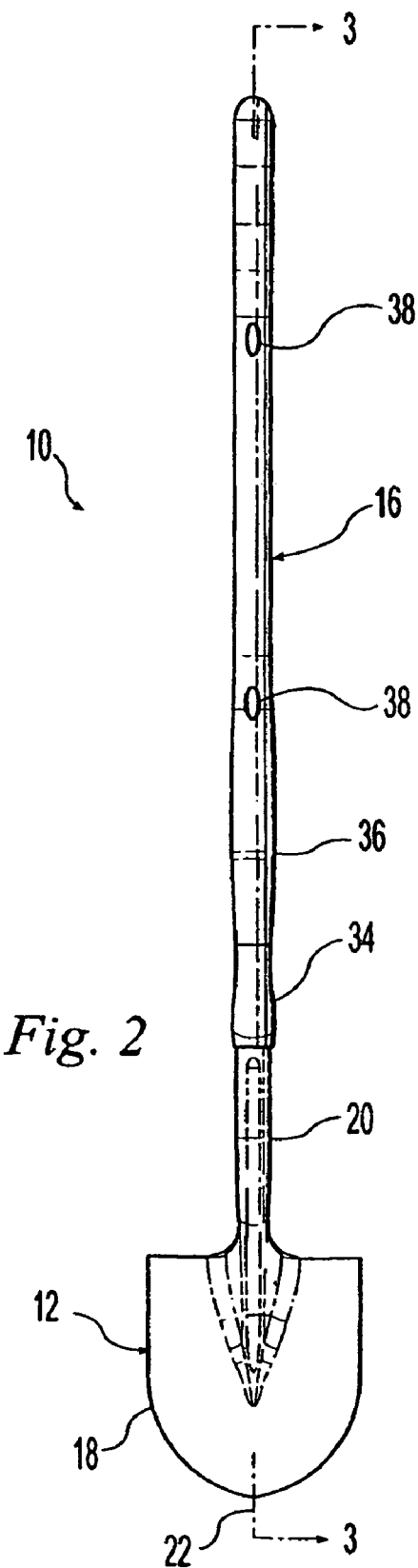
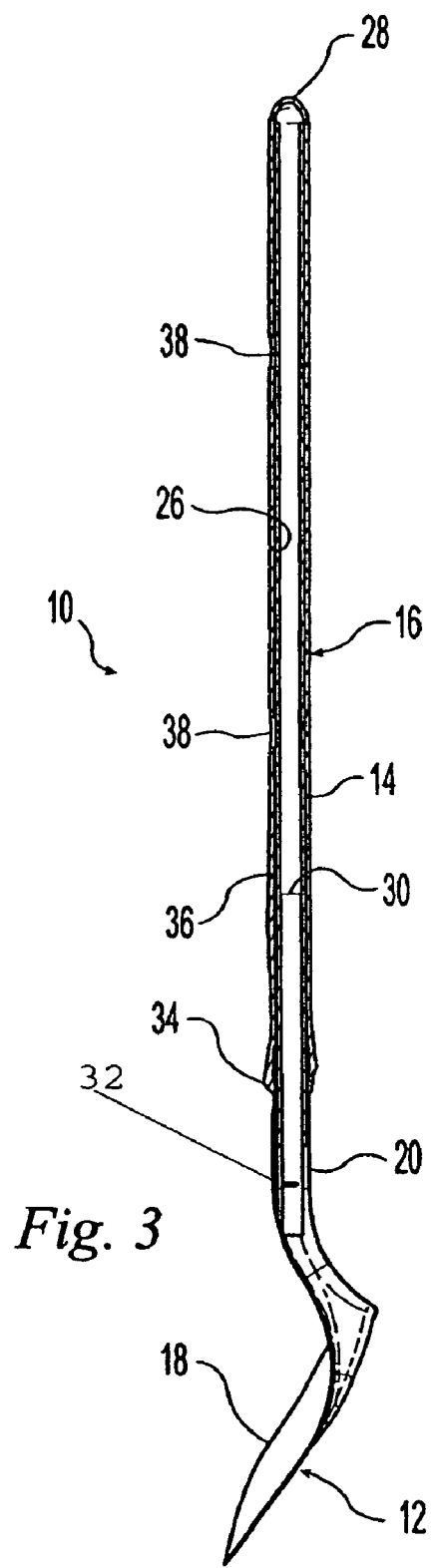
Fig. 2
Fig. 3

LONG-HANDLED TOOL WITH PLASTIC MOLDED-OVER HANDLE

CROSS-REFERENCE TO RELATED APPLICATIONS

This non-provisional patent application claims priority benefit of U.S. provisional patent application No. 60/548,267 filed on Feb. 27, 2004, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to hand-operated tools and, more particularly, to hand-operated, long-handled tools such as shovels and the like having molded handles.

BACKGROUND OF THE INVENTION

Handles for hand-operated, long-handled tools such as, for example, shovels, rakes, hoes, spades, scoops, and forks come in a wide variety of sizes and shapes and are manufactured from a variety of materials. The majority of these long handles were traditionally constructed entirely from wood. While these wood handles provide many desirable characteristics, in some circumstances they have insufficient strength, may not be long lasting when exposed to some environmental conditions, and do not provide the most desirable shapes.

Many prior attempts have been made to overcome these shortcomings. One approach has been to replace the wood handle with a handle entirely formed of structural or reinforced plastic. While these plastic handles out perform wood by providing desirable shapes and environmental-resistance, in some circumstances they still have insufficient strength and in most circumstances are costly to manufacture.

Another approach to overcome these shortcomings has been to replace the wood handles with handles of composite materials. Composite handles typically include an inner core of one material surrounded by an outer shell of a different material. The outer shell is usually plastic. One composite handle, for example, includes a fiberglass tube surrounded by a coating of injected molded plastic. Because these composite handles must be sized to fit within the hands of the user, however, the diameter of the fiberglass tube has a practical upper limit. Thus, these composite handles either provide less than desirable strength or are too large to be comfortably grasped by some users. As a result, these composite handles may be suitable for some types of tools like medium to short handled tools receiving significant impact loads but insignificant bending loads such as, for example, axes, sledgehammers, and the like but they may not suitable for other types of tools like long-handled tools requiring significant bending leverage such as, for example, shovels and the like.

Thus, while these prior approaches to provide improved tool handles may provide improvements under some conditions, they still do not provide a handle which meets the desired characteristics of high strength, weather-resistance, desired shape, and relatively low manufacturing costs. Accordingly, there is still a need in the art for an improved long-handled handle.

SUMMARY OF THE INVENTION

The present invention provides a tool which overcomes at least some of the above-noted problems of the related art. According to the present invention, a tool comprises, in combination, a head having a socket, an elongate handle member partially extending into the socket of the head, and a continuous outer layer of plastic material molded over the handle member and at least partially molded over the socket.

According to another aspect of the present invention, a long-handled tool comprises, in combination, a head having a socket and an elongate handle member partially extending into the socket of the head. The handle member is a tube. A rod partially extends into the handle member and partially extends into the socket. A collar encircles the socket to limit outward expansion of the socket. A continuous outer layer of plastic material is molded over the handle member and at least partially molded over the socket and the collar.

According to another aspect of the present invention, a long-handled shovel comprises, in combination, a head having a blade and a socket and an elongate handle member partially extending into the socket of the head. The handle member is a tube. A rod partially extends into the handle member and partially extends into the socket. A collar encircles the socket to limit outward expansion of the socket. A continuous outer layer of plastic material is molded over the entire length of the handle member and at least partially molded over the socket and the collar.

From the foregoing disclosure and the following more detailed description of various preferred embodiments it will be apparent to those skilled in the art that the present invention provides a significant advance in the technology of hand-operated tools. Particularly significant in this regard is the potential the invention affords for providing a high quality, reliable, comfortable to hold, high strength assembly with improved operational performance. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 2 is a front elevational view of the tool of FIG. 1;

FIG. 3 is a cross-sectional view taken along line 3-3 of FIG. 2;

FIG. 3A is an enlarged, fragmented view showing a portion of FIG. 3;

Figure 1:
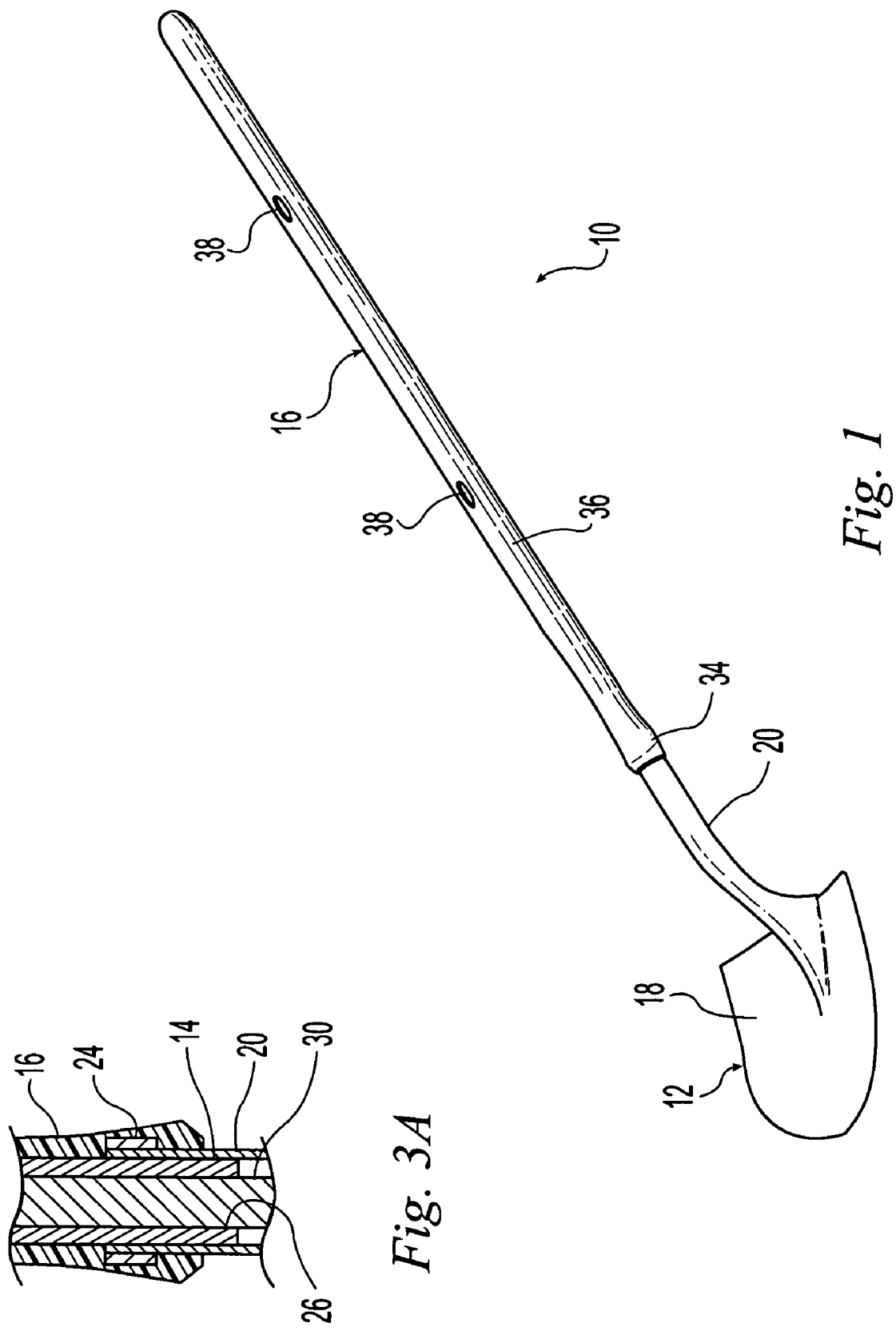
FIG. 1 is a perspective view of a tool according to a preferred embodiment of the present invention.
Figure 4:
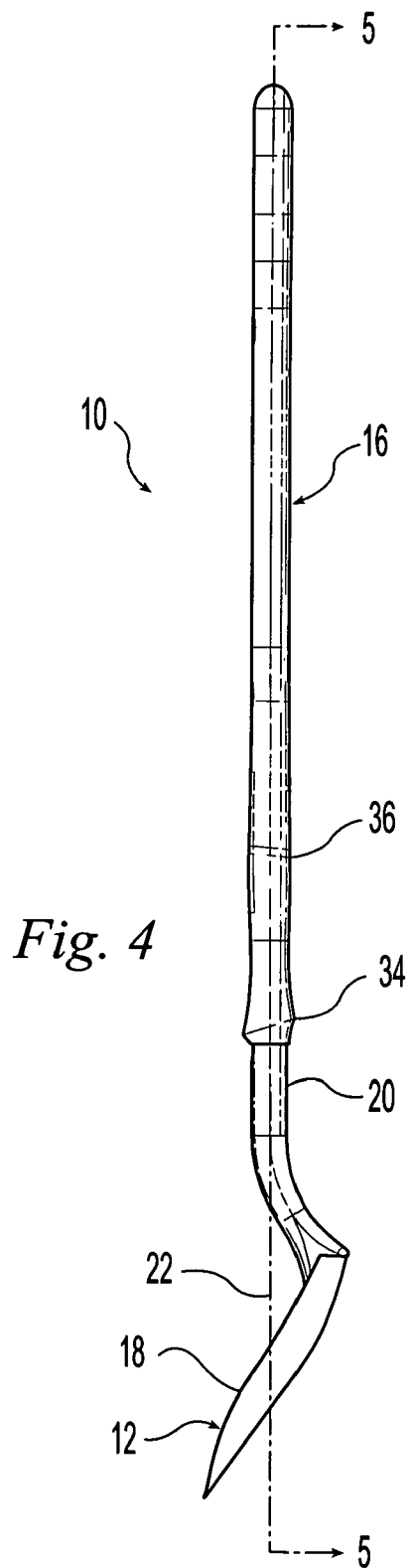
FIG. 4 is a left side elevational view taken of the tool of FIGS. 1 to 3.
Figure 5:
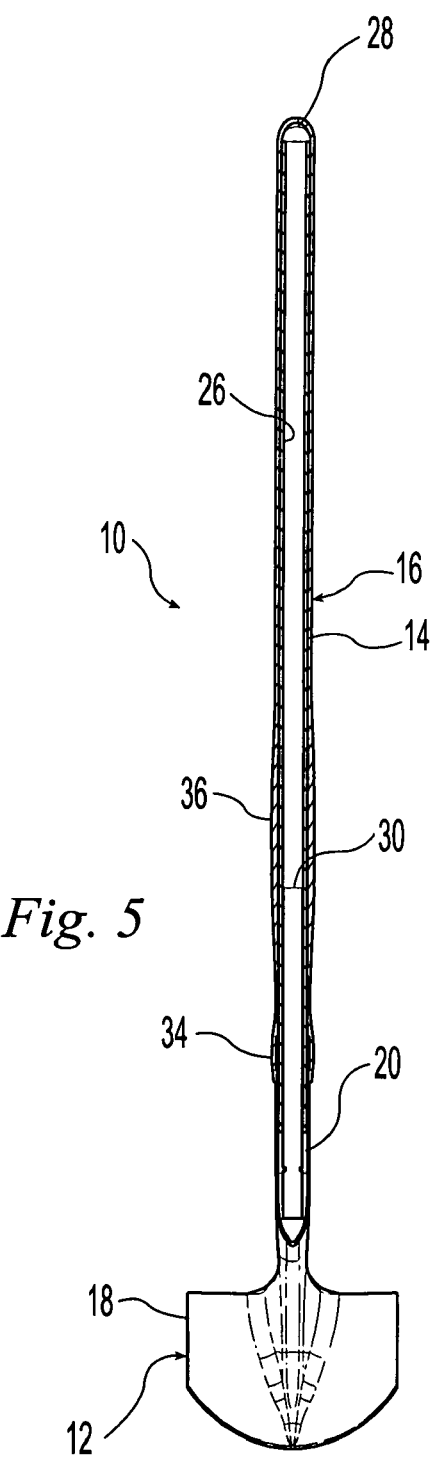
FIG. 5 is a cross-sectional view taken along line 5-5 of FIG. 4.

It should be understood that the appended drawings are not necessarily to scale, presenting a somewhat simplified representation of various preferred features illustrative of the basic principles of the invention. The specific design features of the tool as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tool illustrated in the drawings. In general, up or upward refers to a rightward direction in FIG. 2 and down or downward refers to a leftward direction in FIG. 1. Also in general, front, fore or forward refers to an upward direction in FIG. 5. and aft, rear or rearward refers to a downward direction in FIG. 5.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved hand-operated tools disclosed herein. The following detailed discussion of various alternative and preferred embodiments will illustrate the general principles of the invention with reference to a long-handled shovel for applications in commercial environments. Other embodiments suitable for other applications will be apparent to those skilled in the art given the benefit of this disclosure such as, for example, rakes, hoes, spades, scoops, forks, and the like.

Referring now to the drawings, FIGS. 1 to 5 illustrate a long-handled shovel 10 according to a preferred embodiment of the present invention. The illustrated shovel 10 includes a tool head 12, an elongate handle member 14 attached to the head 12, and a continuous outer layer or covering 16 of plastic material molded over at least a part of each of the handle member 14 and the head 12. The illustrated tool head 12 is in the form of a shovel head having a blade 18 at a first or lower end and a socket 20 at a second or upper end. The socket 20 upwardly extends so that it is coaxial with the central longitudinal axis 22 of the shovel 10. The socket 20 is sized and shaped for receipt of the handle member 14 and is generally open at its upper end. The socket 20 preferably formed by bending metal into a generally cylindrical shape with a longitudinally extending slot along one side, such as the illustrated rear side, so that the wall forming the socket 20 plastically deflects to grip the handle member 14. The head 12 preferably has a separate collar or band 24 encircling the outer surface of the socket 20 at the upper end of the socket 20. The collar 24 is sized and shaped limit outward expansion of the socket 20 particularly when the handle member 14 is inserted therein and during operation of the shovel. The head 12 is preferably formed of a metal such as steel but alternatively can be any other suitable material.

The illustrated handle member 14 is an elongate tube having a central passage 26 extending along its entire length about a central longitudinal axis which is coaxial with the central longitudinal axis 22 of the shovel 10. While the illustrated handle member 14 is a tube, the handle member 14 can alternatively have any suitable shape such as, for example, a solid rod. Also, while the illustrated handle member 14 has a circular shape in cross-section, the handle member 14 can have any suitable shape such as, for example, a square or other polygon, or any non-uniform shape. The handle member 14 is preferably sized and shaped to provide desired strength and shape for a handle and to cooperate with the socket 20. The first or lower end of the handle member 14 extends into the socket 20 of the head 12 while the second or upper end is a free end. The handle member 14 is preferably formed of fiberglass but alternatively can be any other suitable material such as, for example, plastic, wood, or metal. The free or second end of the illustrated handle member 14 is closed by a closure 28. The illustrated closure 28 is a plug but alternatively can be closed by any other suitable closure such as, for example, a cap.

The illustrated shovel 10 includes a rod or stiffening member 30 extending between the handle member 14 and the head 12. A first or bottom end of the rod 30 extends into the socket 20 of the tool head 12 while a second or upper end of the rod 30 extends into the interior passage 26 of the handle member 14. The rod 30 is sized and shaped to be closely received in the interior passage 26 of the handle member 14. The illustrated rod 30 has a transverse slot or notch 32 formed therein near its lower end to increase the flexibility of the rod 30 so that the rod 30 deflects and conforms with the shape of the socket 20 upon insertion thereto and provides a flexing head during operation of the tool 10. The rod 30 is preferably formed of a metal such as, for example, steel but alternatively any other suitable material can be utilized. It should be appreciated that the rod provides resilient flexing between the head and the handle member when prying force are applied thereto.

The illustrated continuous outer layer 16 of plastic material extends over the entire exposed exterior surface of the handle member 14 including the closure 28 and partially extends over the exterior surface of the tool head 12. The illustrated outer layer 16 extends over the upper end of the socket 20 including the entire collar 24. The outer layer 16 is continuous in that a single uninterrupted material is molded-over the joint between the handle member and the socket 20. The outer layer 16 provides added strength by extending over the joint between the handle member 14 and the socket 20.

The plastic outer layer 16 can form an exterior surface of any desired shape. The plastic outer layer 16 is preferably relatively thin so that the resulting handle has a suitable size for grasping by users yet having a handle member 14 of a desired size to obtain suitable strength. The illustrated plastic outer layer 16 has a thickness and exterior size which varies along its longitudinal length. The exterior size of the plastic outer layer 16 is greatest at a head portion 34 where it extends over the socket 20 and the collar 24. The head portion 34 of the plastic outer layer 16 provides additional strength at a location of high stress. Above the collar 24, the thickness gradually reduces along an upward direction toward a free end of the handle member 14 until it gradually increases to a thickened portion 36 located at the upper end of the rod 30. The thickened portion 36 of the plastic outer layer 16 provides additional strength at a location of high stress. Above the thickened portion 36, the plastic outer layer 16 gradually reduces to a relatively thin portion until it slightly increases near the upper end of the handle member 14.

The plastic outer layer 16 is preferably polypropylene but alternatively can be any other suitable thermoplastic such as, for example, polyethylene or the like or any suitable thermoset plastic such as, for example, polyurethane, phenolic or the like. The plastic outer layer 16 is preferably a continuous, unitary layer of material that is molded over the handle member 14 and the head 12 at the same time. Thus, the handle member 14 and the rod 30 are secured to the head 12 prior to injection molding the plastic outer layer 16 over the otherwise completed assembly 10. The illustrated plastic outer layer 16 includes a pair of openings 38 spaced apart along the length of the handle member 14 which are used by positioning pins to accurately locate the handle member 14 within a mold during the overmolding process so that the plastic outer layer 16 has the desired shape and thickness. It is noted that the closure 28 closes the otherwise open upper end of the handle member 14 to substantially prevent entry of plastic material into the interior passage 26 of the handle member 14 during the injection overmolding process.

It is apparent from the foregoing detailed description that the present invention provides an improved long-handled tool having high strength, weather-resistance, desired shape and size, and relatively low manufacturing costs. It is believed that the present invention described herein above provides tool handles having a strength of up to three times those of the prior art while at the same time having a size which fits within the hands of most users.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A tool comprising, in combination:
a head having a socket;
an elongate handle member partially extending into the socket of the head; and
a continuous outer layer of plastic material molded over the handle member and at least partially molded over the socket;
wherein the handle member is a tube;
further comprising a rod partially extending into the handle member and partially extending into the socket; and
wherein a laterally extending notch is formed in the rod within the socket.

2. A tool comprising, in combination:
a head having a socket;
an elongate handle member partially extending into the socket of the head; and
a continuous outer layer of plastic material molded over the handle member and at least partially molded over the socket;
further comprising a rod partially extending into the handle member and partially into the socket; and
wherein a laterally extending notch is formed in the rod within the socket.

3. A tool comprising, in combination:
a head having a socket;
an elongate handle member partially extending into the socket of the head; and
a continuous outer layer of plastic material molded over the handle member and at least partially molded over the socket;
further comprising a rod partially extending into the handle member and partially into the socket; and
wherein the outer layer of plastic material has a thickened portion overlying an upper end of the rod within the handle member.

4. A tool comprising, in combination:
a head having a socket;
an elongate handle member partially extending into the socket of the head; and
a continuous outer layer of plastic material molded over the handle member and at least partially molded over the socket; and
a collar encircling the socket to limit outward expansion of the socket.

5. A tool according to claim 4, wherein the outer layer of plastic material extends over the collar.

6. A tool comprising, in combination:
a head having a socket;
an elongate handle member partially extending into the socket of the head;
a continuous outer layer of plastic material molded over the handle member and at least partially molded over the socket;
wherein the outer layer of plastic material extends over the entire length of the handle member; and
wherein at least two longitudinally spaced apart openings are formed in the outer layer of plastic material along the length of the handle member and exposing portions of the handle member.

7. A long-handled tool comprising, in combination:
a head having a socket;
an elongate handle member partially extending into the socket of the head;
wherein the handle member is a tube;
a rod partially extending into the handle member and partially extending into the socket;
a collar encircling the socket to limit outward expansion of the socket; and
a continuous outer layer of plastic material molded over the handle member and at least partially molded over the socket and the collar.

8. A long-handled tool according to claim 7, wherein the outer layer of plastic material has a thickened portion overlying an upper end of the rod within the handle member.

9. A long-handled tool according to claim 7, wherein the outer layer of plastic material has a thickened portion overlying the collar and the socket.

10. A long-handled tool according to claim 7, wherein a laterally extending notch is formed in the rod within the socket.

11. A long-handled tool comprising, in combination:
a head having a socket;
an elongate handle member partially extending into the socket of the head;
wherein the handle member is a tube;
a rod partially extending into the handle member and partially extending into the socket;
a collar encircling the socket to limit outward expansion of the socket;
a continuous outer layer of plastic material molded over the handle member and at least partially molded over the socket and the collar; and
wherein the outer layer of plastic material extends over the entire length of the handle member.

12. A long-handled tool according to claim 11, wherein at least two longitudinally spaced apart openings are formed in the outer layer of plastic material along the length of the handle member and exposing portions of the handle member.

13. A long-handled shovel comprising, in combination:
a head having a blade and a socket;
an elongate handle member partially extending into the socket of the head;

wherein the handle member is a tube;
a rod partially extending into the handle member and partially extending into the socket;
a collar encircling the socket to limit outward expansion of the socket; and
a continuous outer layer of plastic material molded over the entire length of the handle member, and at least partially molded over the socket and the collar.

* * * * *

UNITED STATES PATENT AND TRADEMARK OFFICE
CERTIFICATE OF CORRECTION

| | | |
|---|---|---|
| PATENT NO. | : 7,753,421 B2 | |
| APPLICATION NO. | : 11/067262 | |
| DATED | : July 13, 2010 | |
| INVENTOR(S) | : Brian J. Conaway et al. | |

It is certified that error appears in the above-identified patent and that said Letters Patent is hereby corrected as shown below:

Column 1, line 42, "out perform" should read --outperform--.
Column 1, line 61, "may not suitable" should read --may not be suitable--.
Column 2, line 3, "long-handled handle" should read --long-handled tool--.
Column 2, line 34, "embodiments it" should read --embodiments, it--.
Column 3, line 46, "shaped limit" should read --shaped to limit--.
Column 4, line 21, "force are" should read --force is--.
Column 5, line 8, "herein above" should read --hereinabove--.
Column 5, line 32, delete "and".
Column 5, line 44, delete "and".
Column 5, line 55, delete "and".
Column 5, line 67, delete "and".

Signed and Sealed this
Eleventh Day of January, 2011

David J. Kappos
*Director of the United States Patent and Trademark Office*